United States Patent
Goto et al.

(10) Patent No.: US 11,186,303 B2
(45) Date of Patent: Nov. 30, 2021

(54) TRAIN CONTROL AND MANAGEMENT SYSTEM, CENTRAL COMMAND DEVICE, SCREEN INFORMATION TRANSMISSION SYSTEM AND SCREEN INFORMATION TRANSMISSION METHOD

(71) Applicant: Mitsubishi Electric Corporation, Tokyo (JP)

(72) Inventors: Ryosuke Goto, Tokyo (JP); Yosuke Isshiki, Tokyo (JP); Yoshihito Takigawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 83 days.

(21) Appl. No.: 16/621,028

(22) PCT Filed: Jun. 16, 2017

(86) PCT No.: PCT/JP2017/022395
§ 371 (c)(1),
(2) Date: Dec. 10, 2019

(87) PCT Pub. No.: WO2018/229988
PCT Pub. Date: Dec. 20, 2018

(65) Prior Publication Data
US 2020/0189634 A1 Jun. 18, 2020

(51) Int. Cl.
*B61L 27/00* (2006.01)
*G05D 1/00* (2006.01)

(52) U.S. Cl.
CPC ....... *B61L 27/0027* (2013.01); *B61L 27/0005* (2013.01); *G05D 1/0016* (2013.01); *G05D 1/0022* (2013.01)

(58) Field of Classification Search
CPC ............. B61L 27/0027; B61L 27/0005; B61L 15/0072; B61L 27/0077; B61L 15/009; G05D 1/0016; G05D 1/0022
(Continued)

(56) References Cited

U.S. PATENT DOCUMENTS

2002/0060658 A1* 5/2002 Tanaka .................. H04N 1/407
345/89
2011/0016403 A1* 1/2011 Shibukawa ......... G06F 16/9577
715/738
2013/0194628 A1 8/2013 Kamimoto

FOREIGN PATENT DOCUMENTS

JP 2003/118577 A * 4/2003
JP 2003118577 A 4/2003
(Continued)

OTHER PUBLICATIONS

Office Action dated Jan. 14, 2020, issued in corresponding Japanese Patent Application No. 2019-524707, 7 pages including 4 pages of English translation.
(Continued)

*Primary Examiner* — Muhammad Shafi
(74) *Attorney, Agent, or Firm* — Buchanan Ingersoll & Rooney PC

(57) ABSTRACT

Included are a CN serving as a communication unit that receives a screen information item request from an OCC serving as a ground-based central command device, a CCU serving as a controller, and a VDU serving as a display unit. The VDU includes an onboard image display unit that displays the screen information item on the basis of the control performed by the CCU, an image processor that generates first image data by putting the screen information item displayed by the onboard image display unit into image form, and an information adder that generates second image data by adding an identification information item on an
(Continued)

operational component to the first image data when an image represented by the first image data includes an image of the operational component that receives an operation from a user. The CN transmits the second image data to the OCC.

9 Claims, 7 Drawing Sheets

(58) Field of Classification Search
USPC .......................................................... 701/19
See application file for complete search history.

(56) References Cited

FOREIGN PATENT DOCUMENTS

| | | | |
|---|---|---|---|
| JP | 2010/044458 A | * | 2/2010 |
| JP | 2010044458 A | | 2/2010 |
| JP | 2011040034 A | | 2/2011 |
| JP | 2012133586 A | | 7/2012 |
| JP | 2013-157860 A | | 8/2013 |

OTHER PUBLICATIONS

International Search Report (PCT/ISA/210), with translation, and Written Opinion (PCT/ISA/237) dated Septembers, 2017, by the Japan Patent Office as the International Searching Authority for International Application No. PCT/JP2017/022395.

* cited by examiner

FIG.3
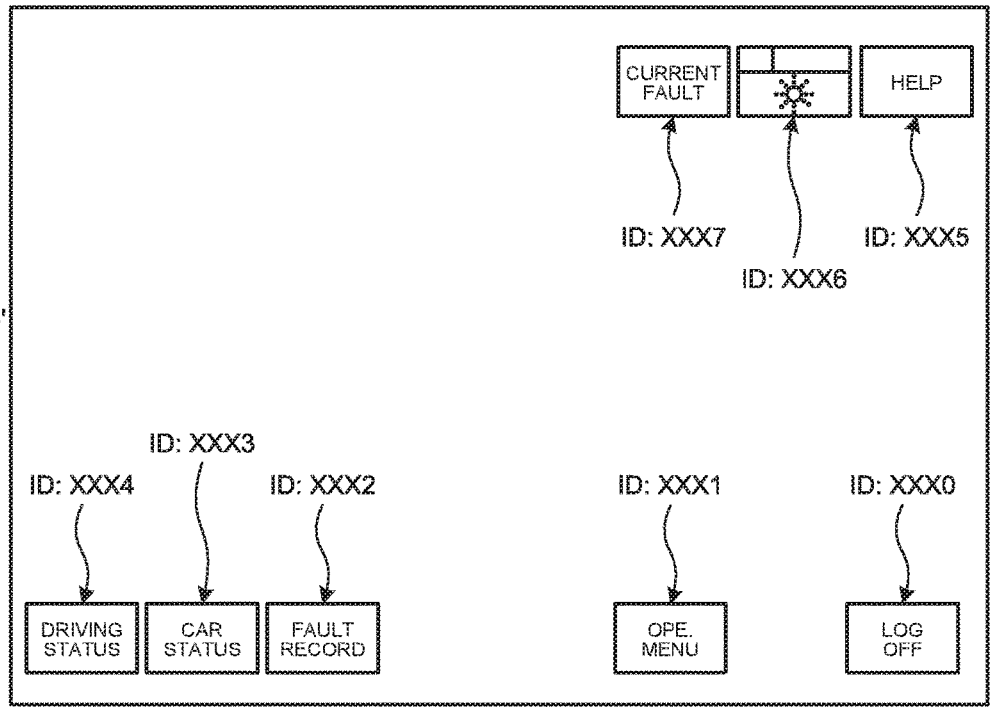
OPERATION COMPONENTS' IDENTIFICATION INFORMATION ITEMS
ADD
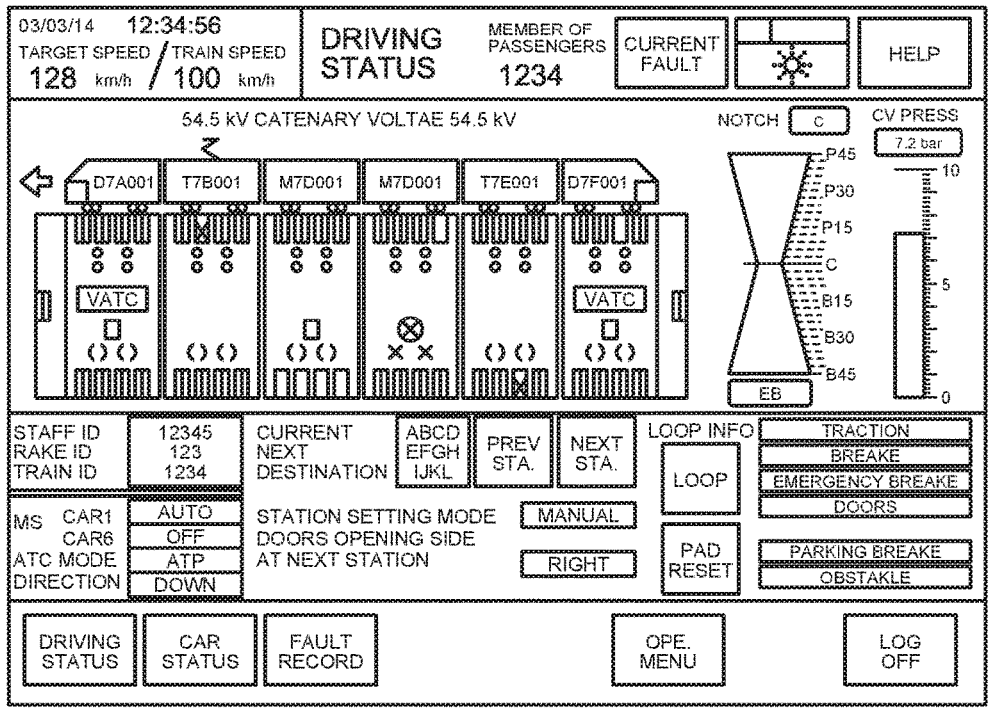
SECOND IMAGE DATA

TRAIN CONTROL AND MANAGEMENT SYSTEM, CENTRAL COMMAND DEVICE, SCREEN INFORMATION TRANSMISSION SYSTEM AND SCREEN INFORMATION TRANSMISSION METHOD

FIELD

The present invention relates to a train control and management system that transmits to a ground side a screen information item displayed in a vehicle. The present invention also relates to a central command device, a screen information transmission system, and a screen information transmission method.

BACKGROUND

Conventionally, a screen information item on a display device installed in a train cab is transmitted to a ground side and is shared when the same screen as that of the onboard display device is displayed by a ground-side display device. However, because of its large data size, the screen information item is difficult to transmit when a transmission band between a train and the ground side is narrow. Patent Literature 1 discloses a technique that enables sharing of a screen information item between an onboard display device and a ground-side display device with the onboard display device transmitting the compressed screen information item to the ground-side display device.

Citation List

Patent Literature

Patent Literature 1: Japanese Patent Application Laid-open No. 2012-133586

SUMMARY

Technical Problem

However, according to the above conventional technique, the ground-side display device can tell, from the compressed screen information item, a content of a screen displayed by the onboard display device but problematically does not enable operation of buttons and others on the screen.

The present invention has been made in view of the above, and an object of the present invention is to obtain a train control and management system that transmits operable image data on a screen information item with a data size compressed.

Solution to Problem

A train control and management system according to an aspect of the present invention includes a communication unit that receives a screen information item request from a ground-based central command device, a controller that performs control based on the screen information item request to cause display of a screen information item that has been requested, and a display unit that displays the screen information item. The display unit includes an onboard image display unit that displays the screen information item on a basis of the control performed by the controller, an image processor that puts the screen information item displayed by the onboard image display unit into image form to generate first image data, and an information adder that adds an identification information item on an operational component to the first image data to generate second image data when an image represented by the first image data includes an image of the operational component that receives an operation from a user. The communication unit transmits the second image data to the central command device.

Advantageous Effect of Invention

The train control and management system according to the present invention can transmit image data on an operable screen information item with a data size compressed.

BRIEF DESCRIPTION OF DRAWINGS

FIG. 3 illustrates an example of second image data generated by a video display unit (VDU).

DESCRIPTION OF EMBODIMENTS

With reference to the drawings, a detailed description is hereinafter provided of a train control and management system, a central command device, a screen information transmission system, and a screen information transmission method according to an embodiment of the present invention. It is to be noted that this embodiment is not restrictive of the present invention.

Embodiment

Figure 1:
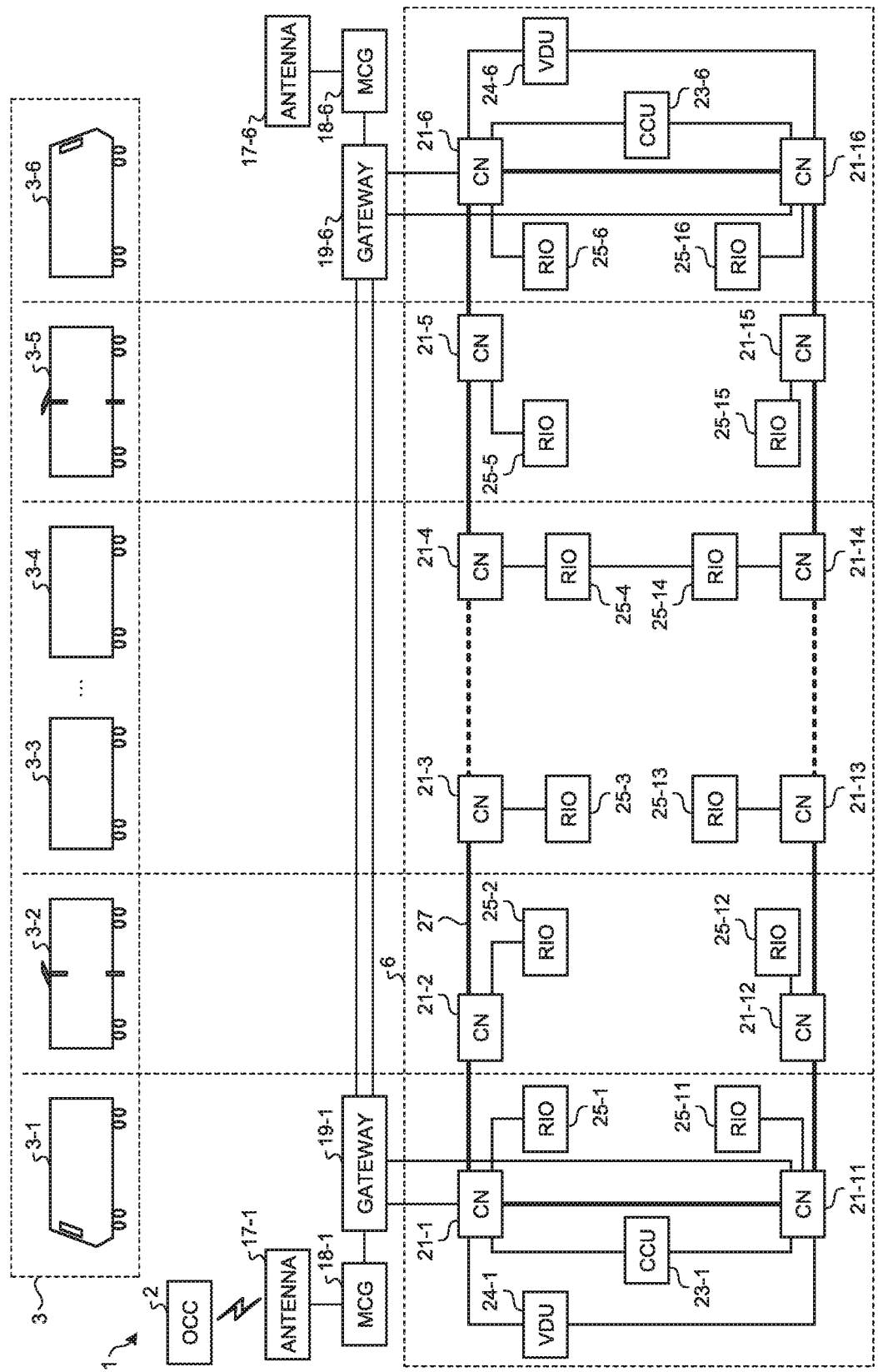
FIG. 1 illustrates a configuration example of a screen information transmission system.

FIG. 1 illustrates a configuration example of the screen information transmission system 1 according to the embodiment of the present invention. The screen information transmission system 1 includes an OCC 2, a TCMS 6, antennas 17-1 and 17-6, mobile communication gateways (MCGs) 18-1 and 18-6, and gateways 19-1 and 19-6. The OCC 2 is the ground-based central command device. The OCC 2 receives an operation from a user who is, for example, a monitor and transmits a screen information item request to the TCMS 6 to request transmission of a screen information item displayed by a VDU 24-1 or 24-6 that is described later. The OCC 2 also displays image data on the screen information item obtained from the TCMS 6; specifically, the second image data that is described later. The OCC 2 also receives an operation from the monitor and transmits to the TCMS 6, as a screen change request, operational information obtained when an operational component such as a button of the obtained second image data is operated, namely an identification information item on the specified operational component. The TCMS 6 mounted on a train 3 is the train control and management system that transmits the second image data to the OCC 2 on the basis of the screen information item request received from the OCC 2. The TCMS 6 also performs, on the basis of the screen change request received from the OCC 2, control on the train 3 in accordance with the operation to the specified operational component identified by the identification information item and transmits, to the OCC 2, second image data on a screen information item after the operation.

In FIG. 1, the TCMS 6, the antennas 17, the MCGs 18, and the gateways 19 are external to vehicles 3-1 to 3-6 of the train 3. However, practically, these constituent elements may be inside the train 3. A number appended to the end of a numeral of each of the constituent elements denotes the vehicle to which the constituent element is mounted. The same applies to those constituent elements that are described later. The vehicle mounted with the constituent elements is an example, so that the present disclosure is not limited to the FIG. 1 example.

Each of the antennas 17-1 and 17-6 of the train 3 transmits and receives data to and from the OCC 2. Communication between the train 3 and the OCC 2 can be performed, for example, by Wi-Fi (registered trademark) communication based on wireless local area network (wireless LAN) standards but is not limited to this. When no distinction is made between the antennas 17-1 and 17-6, these constituent elements may be referred to as antennas 17. The MCGs 18-1 and 18-6 and the gateways 19-1 and 19-6 are network devices that perform protocol conversions and others. When no distinction is made between the MCGs 18-1 and 18-6, each of these constituent elements may be referred to as MCGs 18. When no distinction is made between the gateways 19-1 and 19-6, each of these constituent elements may be referred to as gateways 19. Although the TCMS 6 communicates with the OCC 2 via the antenna 17-1, the MCG 18-1, and the gateway 19-1 in the example of FIG. 1, the TCMS 6 is also capable of communicating with the OCC 2 via the antenna 17-6, the MCG 18-6, and the gateway 19-6. A description is hereinafter provided of the FIG. 1 example in which the TCMS 6 communicates with the OCC 2 via the antenna 17-1, the MCG 18-1, and the gateway 19-1.

The TCMS 6 includes communication nodes (CNs) 21-1 to 21-6 and 21-11 to 21-16, central control units (CCUs) 23-1 and 23-6, the VDUs 24-1 and 24-6, and remote input and output units (RIOs) 25-1 to 25-6 and 25-11 to 25-16. The constituent elements in the TCMS 6 are connected in the vehicle or between the vehicles over an Ethernet (registered trademark) network.

The CNs 21-1 to 21-6 and 21-11 to 21-16 compose a TCMS network 27 based on Ethernet standards. As indicated by a thick line in FIG. 1, the TCMS network 27 is a looped network. The CNs 21-1 to 21-6 and 21-11 to 21-16 are communication units that operate as hubs. Among these, the CNs 21-1 and 21-11 are connected to the gateway 19-1, and the CNs 21-6 and 21-16 are connected to the gateway 19-6. The CNs 21-1 to 21-6 and 21-11 to 21-16 may have identical or different configurations. When no distinction is made among the CNs 21-1 to 21-6 and 21-11 to 21-16, these constituent elements may be referred to as CNs 21.

Each of the CCUs 23-1 and 23-6 is a controller that controls operation of each of the constituent elements of the TCMS 6 and monitors vehicle apparatuses (not illustrated) connected to the TCMS 6 to control operation of the vehicle apparatuses. One of the CCUs 23-1 and 23-6 is mounted on the vehicle serving as the lead vehicle of the train 3, while the other of the CCUs 23-1 and 23-6 is mounted on the vehicle serving as the tail vehicle of the train 3. The CCUs 23-1 and 23-6 have identical configurations. When no distinction is made between the CCUs 23-1 and 23-6, each of these constituent elements may be referred to as CCUs 23.

Each of the VDUs 24-1 and 24-6 is a display unit that displays information necessary for operation of the train 3 to a user who is, for example, a motorman. The VDU 24-1 or 24-6 is mounted on the vehicle serving as the lead vehicle or the tail vehicle of the train 3. The VDUs 24-1 and 24-6 have identical configurations. When no distinction is made between the VDUs 24-1 and 24-6, these constituent elements may be referred to as VDUs 24.

Each of the RIOs 25-1 to 25-6 and 25-11 to 25-16 is a signal input and output unit that provides signal inputs to each vehicle apparatus and obtains signal outputs from each vehicle apparatus. The RIOs 25-1 to 25-6 and 25-11 to 25-16 may be configured differently depending on their vehicle apparatuses connected. When no distinction is made among the RIOs 25-1 to 25-6 and 25-11 to 25-16, these constituent elements may be referred to as RIOs 25.

In the TCMS 6, the CCU 23 communicates with the vehicle apparatuses via one or more CNs 21 or via one or more CNs 21 and one or more RIOs 25.

Figure 2:
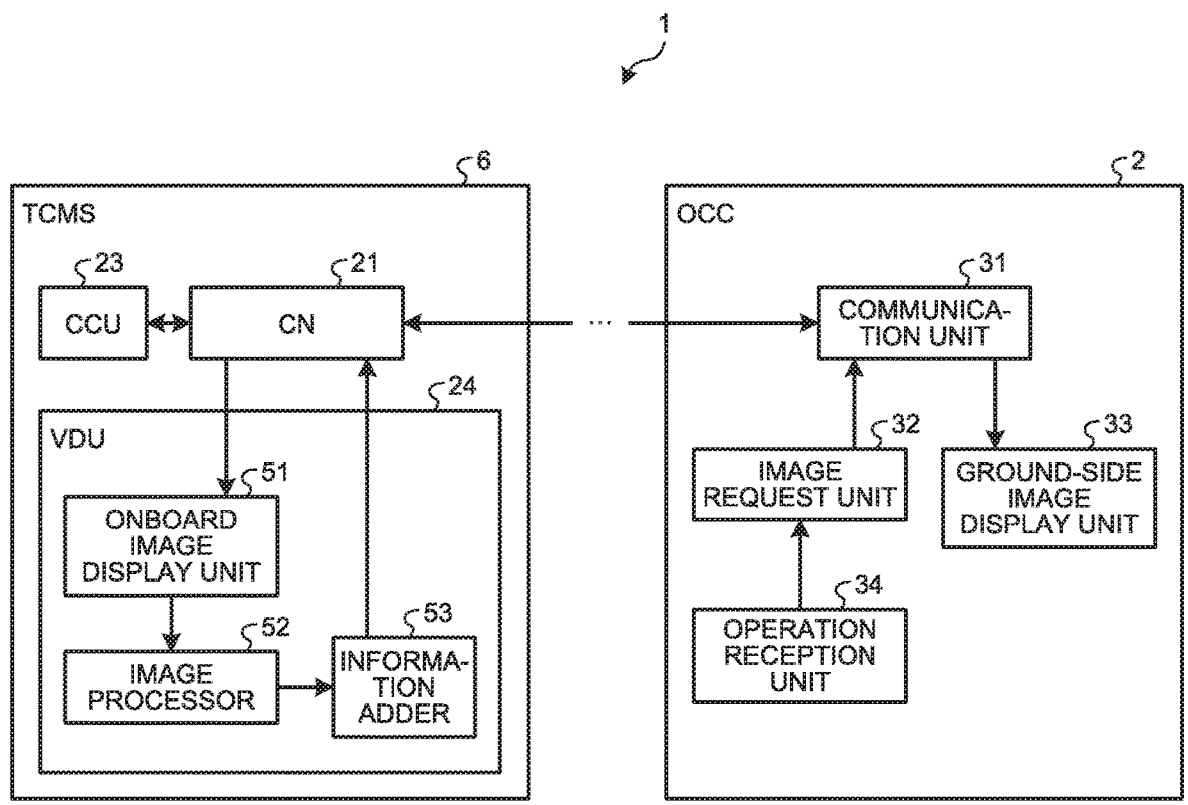
FIG. 2 is a block diagram illustrating the configuration example of the screen information transmission system.

FIG. 2 is a block diagram illustrating the configuration example of the screen information transmission system 1 according to the present embodiment. The OCC 2 includes a communication unit 31, an image request unit 32, a ground-side image display unit 33, and an operation reception unit 34. The image request unit 32 receives an operation from the monitor via the operation reception unit 34, and generates a screen information item request which requests the TCMS 6 to transmit a screen information item displayed by the VDU 24. The ground-side image display unit 33 displays image data obtained from the TCMS 6. The operation reception unit 34 receives the operation from the monitor and thus requests the screen information item. The operation reception unit 34 also receives an operation from the monitor in relation to the image data displayed by the ground-side image display unit 33. The operation reception unit 34 receives a selection of an identification information item on a specified operational component, through the operation carried out by the monitor, from among identification information items of operational components added in the second image data. The communication unit 31 transmits to the TCMS 6 the screen information item request and a screen change request that is the identification information item on the specified operational component. The communication unit 31 also receives the image data from the TCMS 6.

The TCMS 6 includes the CN 21, the CCU 23, and the VDU 24. Each of these constituent elements is described as a single unit in FIG. 2; however, the TCMS 6 actually includes a plurality of each of these constituent elements as illustrated in FIG. 1. It is to be noted that the RIO 25 is omitted from FIG. 2. The CN 21 receives the screen information item request and the screen change request from the OCC 2. The CCU 23 performs control, based on the screen information item request received from the OCC 2, to cause the VDU 24 to display the screen information item that has been requested. The VDU 24 displays the screen information item.

The VDU 24 includes an onboard image display unit 51, an image processor 52, and an information adder 53. The onboard image display unit 51 displays information necessary for the train operation to the motorman. The onboard image display unit 51 displays the screen information item on the basis of the control performed by the CCU 23. The image processor 52 records the screen information item displayed on a screen of the onboard image display unit 51 in image form, that is to say, in data form. Screenshotting is an example of a method of putting the screen information item into image form. The screenshotting is used by the image processor 52 and has a function of taking a shot of the content displayed on the screen of the onboard image display unit 51 to record the displayed content. Here the image processor 52 puts the screen information item into image form specifically by use of the screenshotting. Obtained image data on the screen information item as a result of the screenshotting by which the screen information item is put into image form, is defined as first image data. The image processor 52 generates the first image data. The information adder 53 adds, to the first image data, the identification information item on each of the operational components when an image represented by the first image data includes these operational components that receive an operation from a user. The information adder 53 generates image data, as the second image data, by adding the identification information item on each of the operational components to the first image data and transmits the second image data to the CN 21. The user is, for example, the motorman or the monitor. The CN 21 receives the screen information item request from the OCC 2 and transmits to the OCC 2 the second image data as a response to the screen information item request.

FIG. 3 illustrates an example of the second image data generated by the VDU 24 according to the present embodiment. The first image data is the image data generated as a result of the screenshotting by the image processor 52. The identification information item on operational component is an information item to be added to the screen information item displayed by the onboard image display unit 51, specifying layout of the operational component including an operation button and identifying each operational component. The identification information item on the operational component is, for example, "ID: XXX0" as illustrated in FIG. 3. The onboard image display unit 51 displays finite kinds of screen information items. Therefore, the information adder 53 prestores the identification information item on each of those operational components corresponding to each of the screen information items. The information adder 53 generates the second image data by adding, to the first image data generated by the image processor 52, the identification information items on the corresponding operational components. Examples of a method that the information adder 53 carries out to add the identification information items of the operational components to the first image data includes, superimposing the identification information items of the operational components on the first image data; but the method is not limited thereto.

Figure 4:
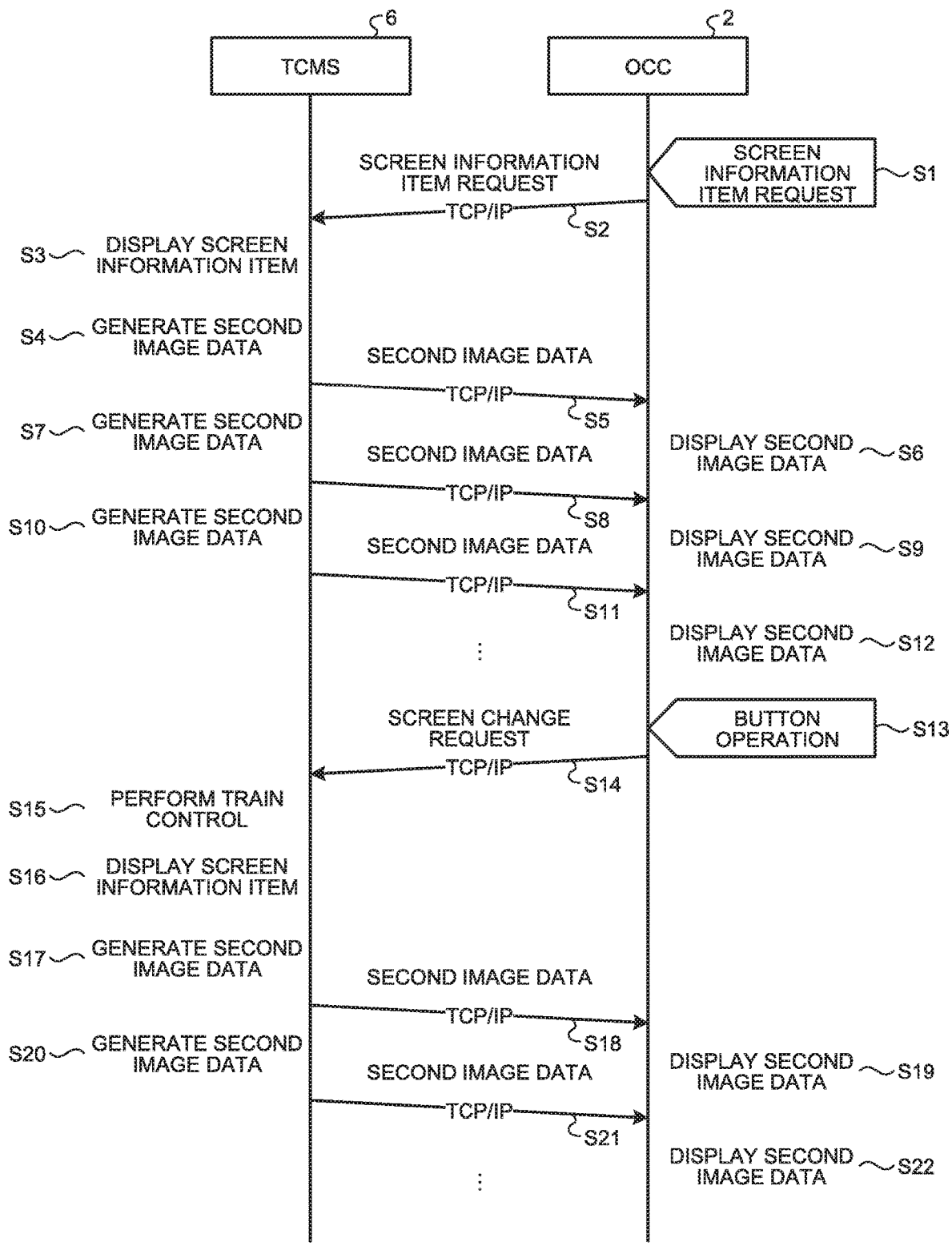
FIG. 4 is a sequence diagram illustrating operation for transmission and reception of image data in the screen information transmission system.

A description is provided next of operation in the screen information transmission system 1 in which the OCC 2 transmits a screen information item request to the TCMS 6 which in turn transmits image data to the OCC 2. FIG. 4 is a sequence diagram illustrating the operation for transmission and reception of image data in the screen information transmission system 1 according to the present embodiment. The operation reception unit 34 of the OCC 2 first receives a request for a screen information item from the monitor (step S1). The image request unit 32 generates a screen information item request on the basis of an instruction from the operation reception unit 34 and passes the screen information item request to the communication unit 31. The communication unit 31 transmits the screen information item request to the TCMS 6 (step S2). The communication between the OCC 2 and the TCMS 6 uses commonly used Transmission Control Protocol/Internet Protocol (TCP/IP) protocol; but is not limited to this. Upon receiving the screen information item request from the OCC 2, the CN 21 of the TCMS 6 outputs the screen information item request to the CCU 23. The CCU 23 performs control to cause the onboard image display unit 51 of the VDU 24 to display the screen information item indicated in the screen information item request. The onboard image display unit 51 displays the screen information item on the basis of the control performed by the CCU 23 (step S3).

The image processor 52 of the VDU 24 puts the screen information item displayed by the onboard image display unit 51 into image form by use of the screenshotting, thus generating first image data. The information adder 53 generates second image data by adding, to the first image data generated by the image processor 52, the identification information items of the operational components (step S4). The information adder 53 passes the second image data thus generated to the CN 21. The CN 21 transmits the second image data to the OCC 2 (step S5). Upon receiving the second image data, the communication unit 31 of the OCC 2 passes the received second image data to the ground-side image display unit 33. The ground-side image display unit 33 displays the second image data (step S6).

The image processor 52 of the TCMS 6 thereafter generates first image data at predetermined intervals. The predetermined interval may be preset in the image processor 52 or specified in the screen information item request transmitted from the OCC 2. Following the first image data generation performed by the image processor 52, generation of second image data is performed by the information adder 53 at the predetermined intervals (steps S7 and S10). The CN 21 transmits the second image data to the OCC 2 at the predetermined intervals (steps S8 and S11). The ground-side image display unit 33 of the OCC 2 displays the second image data at the predetermined intervals (steps S9 and S12).

While the second image data is updated and displayed at the predetermined intervals in the OCC 2, the operation reception unit 34 receives a button operation from the monitor (step S13). When, for example, a touch panel is used to implement the operation reception unit 34 and the ground-side image display unit 33, the operation reception unit 34 receives the button operation from the monitor by extracting the identification information item corresponding to the operational component that is selected by the monitor on a screen of the ground-side image display unit 33. As illustrated in FIG. 3, the position of each operational component, namely, the button, and the position to which the corresponding identification information item is assigned, are the same in the second image data. For this reason, the operation reception unit 34 can easily extract the identification information item on the operational component that identifies the button operated by the monitor. The operation reception unit 34 may obtain the identification information item on the operational component by receiving input of character information such as "ID: XXX0" from the monitor.

The operation reception unit 34 passes to the image request unit 32 the identification information item on the specified operational component that corresponds to the button operated by the monitor. Upon receiving the identification information item on the specified operational component from the operation reception unit 34, the image request unit 32 generates a screen change request and passes the screen change request to the communication unit 31. The communication unit 31 transmits the screen change request to the TCMS 6 (step S14). Upon receiving the screen change request from the OCC 2, the CN 21 of the TCMS 6 outputs the screen change request to the CCU 23. The CCU 23 performs, on the basis of the screen change request, control on the train 3 in accordance with the operation of the specified button (operational component) that corresponds to the identification information item indicated in the screen change request (step S15). Specific examples of the control on the train 3 that is performed by the CCU 23 include starting air conditioning operation, stopping the air conditioning operation, and changing a temperature setting of an air conditioner when the above-mentioned vehicle apparatus is the air conditioner. When the vehicle apparatus is the VDU 24, a specific example of the train control is changing the screen of the onboard image display unit 51. The CCU 23 performs control to cause the onboard image display unit 51 to display a screen information item after the operation. The onboard image display unit 51 displays, on the basis of the control performed by the CCU 23, the screen information item after the operation (step S16). The subsequent steps S17 to S22 are respectively identical to steps S7 to S12 described above.

As for how the TCMS 6 ends transmission of image data to the OCC 2, a transmission stop instruction may be transmitted from the OCC 2 to the TCMS 6, or the screen information item request to be transmitted from the OCC 2 to the TCMS 6 may include information on a time period during which the image data transmission is to be performed or a number of times the image data transmission is to be performed.

Figure 5:
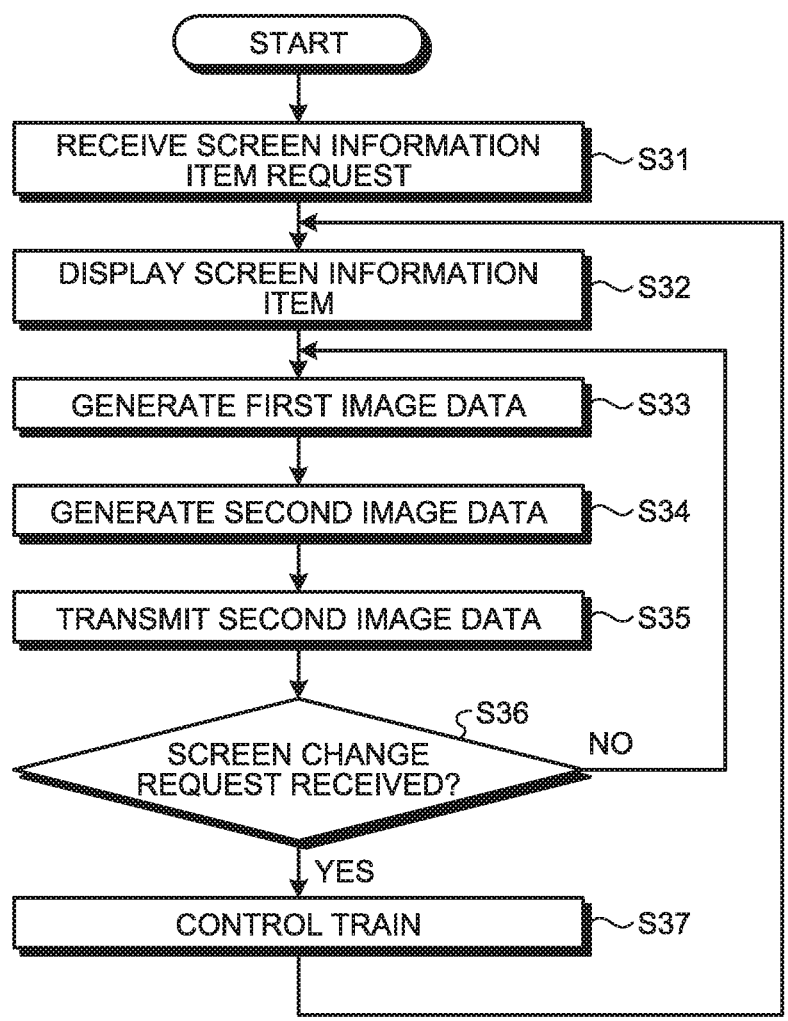
FIG. 5 is a flowchart illustrating operation of a Train Control and Monitoring System (TCMS) for transmission of image data to an operation control center (OCC).

With reference to flowcharts, a description is provided of operation of the TCMS 6 and operation of the OCC 2. FIG. 5 is the flowchart illustrating the operation of the TCMS 6 according to the present embodiment for transmission of the image data to the OCC 2. When the screen information item request from the OCC 2 is received by the TCMS 6 (step S31), the onboard image display unit 51 displays, on the basis of the control performed by the CCU 23, the screen information item that has been requested (step S32). The image processor 52 generates the first image data from the screen information item displayed by the onboard image display unit 51 (step S33). The information adder 53 generates the second image data by adding the identification information items of the operational components to the first image data generated by the image processor 52 (step S34). The CN 21 transmits the second image data to the OCC 2 (step S35). When no screen change request from the OCC 2 is being received by the TCMS 6 (step S36: No), the procedure returns to step S33, and the above-stated steps are repeated. When the screen change request is received from the OCC 2 (step S36: Yes), the CCU 23 performs the control on the train 3 on the basis of the screen change request (step S37). The procedure thereafter returns to step S32, and the above-stated steps are repeated.

Figure 6:
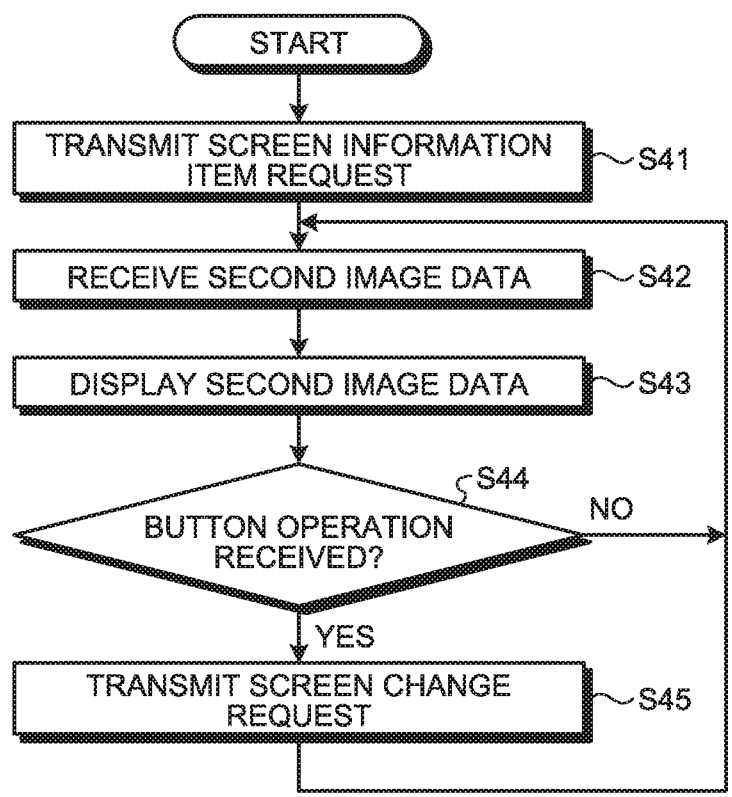
FIG. 6 is a flowchart illustrating operation of the OCC for acquisition and display of the image data.

FIG. 6 is the flowchart illustrating the operation of the OCC 2 according to the present embodiment for acquisition and display of the image data. The image request unit 32 generates the screen information item request on the basis of the instruction from the operation reception unit 34. The communication unit 31 transmits the screen information item request to the TCMS 6 (step S41). The communication unit 31 receives the second image data transmitted by the TCMS 6 (step S42). The ground-side image display unit 33 displays the second image data (step S43). When no button operation is being received from the monitor by the operation reception unit 34 of the OCC 2 (step S44: No), the procedure returns to step S42, and the above-stated steps are repeated. When the button operation is received from the monitor by the operation reception unit 34 (step S44: Yes), the image request unit 32 generates the screen change request on the basis of an instruction from the operation reception unit 34. The communication unit 31 transmits the screen change request to the TCMS 6 (step S45). The procedure returns thereafter to step S42, and the above-stated steps are repeated.

A description is provided next of a hardware configuration of the TCMS 6. The CN 21 of the TCMS 6 is an interface circuit capable of transmitting and receiving an Ethernet frame. The RIO 25 is a RIO circuit, namely, a serial-parallel conversion circuit. The onboard image display unit 51 of the VDU 24 is a display such as a liquid crystal display (LCD). The CCU 23, and the image processor 52 and the information adder 53 of the VDU 24 are implemented by use of a processing circuitry. In other words, the TCMS 6 includes the processing circuitry that is capable of putting the screen information item into image form to generate the first image data and adding the identification information items of the operational components to the first image data to generate the second image data. The processing circuitry may include a memory and a processor that executes a program stored in the memory or may be dedicated hardware.

Figure 7:
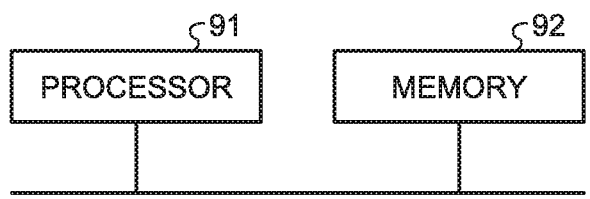
FIG. 7 illustrates an example of a case where a processing circuitry of the TCMS is formed of a processor and a memory.

FIG. 7 illustrates an example of the case where the processing circuitry of the TCMS 6 according to the present embodiment is configured by the processor and the memory. When the processing circuitry is configured by the processor 91 and the memory 92, the functions of the processing circuitry of the TCMS 6 are implemented by means of software, firmware, or a combination of software and firmware. The software or the firmware is described as a program and is stored in the memory 92. In the processing circuitry, the processor 91 reads and executes the program stored in the memory 92 to implement each of the functions. This means that the processing circuitry includes the memory 92 that stores the program which consequently causes to generate first image data achieved by putting the screen information item into image form, and second image data achieved by adding identification information items of the operational components to the first image data. In other words, these programs cause a computer to execute the steps and the methods of the TCMS 6.

The processor 91 here may be, for example, a central processing unit (CPU), a processing unit, an arithmetic unit, a microprocessor, a microcomputer, or a digital signal processor (DSP). The memory 92 corresponds to, for example, a nonvolatile or volatile semiconductor memory such as a random-access memory (RAM), a read-only memory (ROM), a flash memory, an erasable programmable ROM (EPROM), or an electrically EPROM (EEPROM) (registered trademark), a magnetic disk, a flexible disk, an optical disk, a compact disk, a mini disk, or a digital versatile disc (DVD).

Figure 8:
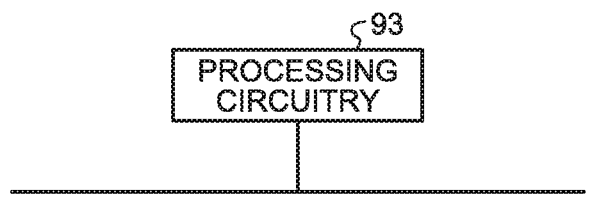
FIG. 8 illustrates an example of a case where the processing circuitry of the TCMS is dedicated hardware.

FIG. 8 illustrates an example of the case where the processing circuitry of the TCMS 6 according to the present embodiment is the dedicated hardware. When the processing circuitry is the dedicated hardware, the processing circuitry 93 illustrated in FIG. 8 corresponds to, for example, a single circuit, a composite circuit, a programmed processor, a parallel programmed processor, an application specific integrated circuit (ASIC), a field-programmable gate array (FPGA), or a combination of these. The functions of the TCMS 6 may be implemented individually or collectively by the processing circuitry 93.

It is to be noted that some of the functions of the TCMS 6 may be implemented by dedicated hardware, while some of the other functions may be implemented by software or firmware. By including the dedicated hardware, the software, the firmware or the combination of these, the processing circuitry can implement the above functions.

Although the explanation has been made for the configuration of the TCMS 6, a hardware configuration of the OCC 2 is similar to the described hardware configuration of the TCMS 6. The communication unit 31 of the OCC 2 is an interface circuit capable of communicating with the OCC 2 and the TCMS 6. The ground-side image display unit 33 is a display such as an LCD. The operation reception unit 34 is a device such as a mouse or a keyboard. The ground-side image display unit 33 and the operation reception unit 34 may be integrated into a touch panel. The image request unit 32 is implemented by use of a processing circuitry. Similarly, this processing circuitry may include a memory 92 and a processor 91 that executes a program stored in the memory 92, like those illustrated in FIG. 7 or may be dedicated hardware like the one illustrated in FIG. 8.

In the screen information transmission system 1 according to the present embodiment described above, in response to the screen information item request from the OCC 2, the TCMS 6 generates the second image data by adding, to the first image data obtained as a result of putting the screen information item into image form by means of the screen-shotting, the identification information items of the operational components such as the button, and transmits the second image data to the OCC 2. The OCC 2 notifies the TCMS 6 the identification information items of the operational components included in the second image data, so that the train 3 can be operated. Thus, the TCMS 6 can transmit, to the OCC 2, the image data on the screen information item operable from the OCC 2 with the image data having a compressed data size.

The above configurations illustrated in the embodiment are illustrative of the subject of the present invention, can be combined with other techniques that are publicly known and can be partly omitted or changed without departing from the gist of the present invention.

REFERENCE SIGNS LIST

1 screen information transmission system; 2 OCC; 3 train; 3-1 to 3-6 vehicle; 6 TCMS; 17-1, 17-6 antenna; 18-1, 18-6 MCG; 19-1, 19-6 gateway; 21, 21-1 to 21-6, 21-11 to 21-16 CN; 23, 23-1, 23-6 CCU; 24, 24-1, 24-6 VDU; 25, 25-1 to 25-6, 25-11 to 25-16 RIO; 27 TCMS network; 31 communication unit; 32 image request unit; 33 ground-side image display unit; 34 operation reception unit; 51 onboard image display unit; 52 image processor; information adder.

The invention claimed is:

1. A train control and management system comprising:
a communication circuit to receive a screen information item request from a ground-based central command device;
an onboard image display to display the screen information item;
first processing circuitry
to perform, on a basis of the screen information item request, control that causes the onboard image display to display a screen information item that has been requested; and
to generate first image data by taking a shot of the screen information item displayed on the onboard image display into image form recording the displayed screen information item; and
to generate second image data by adding an identification information item on an operational component to the first image data when an image represented by the first image data includes an image of the operational component that receives an operation from a user, and
the communication circuit transmits the second image data to the ground-based central command device, and
the first processing circuitry stores in advance the identification information item on the operational component corresponding to the screen information item.

2. The train control and management system according to claim 1, wherein
the first processing circuitry generates the first image data at predetermined intervals.

3. The train control and management system according to claim 1, wherein:
upon receiving, from the ground-based central command device, a screen change request that is the identification information item on the operational component that has been specified, the communication circuit outputs the screen change request to the first processing circuitry;
the first processing circuitry performs, on a basis of the screen change request, control that causes the onboard image display to display a screen information item after operation, to which an operation according to the operational component that has been specified is carried out;
the onboard image display displays the screen information item after operation; and
the first processing circuitry puts the screen information item after operation into image form to generate first image data.

4. A screen information transmission system comprising:
the train control and management system according to claim 1, and
a central command device wherein
upon receiving, from the ground-based central command device, a screen change request that is the identification information item on the operational component that has been specified, the communication circuit outputs the screen change request to the first processing circuitry;
the first processing circuitry performs, on a basis of the screen change request, control that causes the onboard image display to display a screen information item after operation, to which an operation according to the operational component that has been specified is carried out;
the onboard image display displays the screen information item after operation; and
the first processing circuitry puts the screen information item after operation into image form to generate first image data, and wherein
the central command device comprises:
second processing circuitry to generate a screen information item request that requests the train control and management system according to claim 1 to transmit a screen information item displayed on the onboard image display of the train control and management system;
a communication circuit to transmit the screen information item request to the train control and management system;
a ground-side image display to display second image data obtained from the train control and management system
an operation reception device to receive an identification information item on an operational component that is specified by being selected from among the identification information item(s) on the operational component(s) added in the second image data, wherein the communication circuit transmits, to the train control and management system, a screen change request that is the identification information item on the specified operational component.

5. The train control and management system according to claim 1, wherein generation of the first image data is performed by taking a screenshot of the displayed screen information item.

6. A central command device comprising:
- second processing circuitry to generate a screen information item request that requests the train control and management system according to claim 1 to transmit a screen information item displayed on the onboard image display of the train control and management system;
- a communication circuit to transmit the screen information item request to the train control and management system; and
- a ground-side image display to display second image data obtained from the train control and management system.

7. The central command device according to claim 6, further comprising
- an operation reception device to receive an identification information item on an operational component that is specified by being selected from among the identification information item(s) on the operational component(s) added in the second image data, wherein the communication circuit transmits, to the train control and management system, a screen change request that is the identification information item on the specified operational component.

8. A screen information transmission method comprising:
- receiving a screen information item request from a ground-based central command device;
- controlling, on a basis of the screen information item request, display of a screen information item that has been requested;
- displaying the screen information item;
- generating first image data by taking a shot of the screen information item displayed into image form recording the displayed screen information item;
- generating second image data by adding an identification information item on an operational component to the first image data when an image represented by the first image data includes the operational component that receives an operation from a user; and
- transmitting the second image data to the ground-based central command device, and
- the identification information item on the operational component corresponding to the screen information item is stored in advance.

9. The screen information transmission method according to claim 8, wherein generation of the first image data is performed by taking a screenshot of the displayed screen information item.

* * * * *